United States Patent [19]

Mackey

[11] Patent Number: 5,255,785
[45] Date of Patent: Oct. 26, 1993

[54] SHIELDED FLOPPY DISK CARTRIDGE MAILING ENVELOPE

[75] Inventor: David L. Mackey, New Boston, N.H.

[73] Assignee: Amherst International Corporation, Manchester, N.H.

[21] Appl. No.: 897,336

[22] Filed: Jun. 11, 1992

[51] Int. Cl.⁵ ............................................ B65D 85/30
[52] U.S. Cl. .................................. 206/444; 206/309; 229/82
[58] Field of Search ............... 206/309, 312, 313, 444; 229/82, 84, 72

[56] References Cited

U.S. PATENT DOCUMENTS

| | | | |
|---|---|---|---|
| 666,561 | 1/1901 | Rudkin | 229/82 |
| 922,600 | 5/1909 | Kruger | 229/82 |
| 4,247,002 | 1/1981 | Hortan | 206/313 |
| 4,355,718 | 10/1982 | Hagelberg | 206/312 |
| 4,473,153 | 9/1983 | Colangelo | 206/312 |
| 4,863,032 | 9/1989 | Bothe et al. | 206/444 |

FOREIGN PATENT DOCUMENTS

| | | | |
|---|---|---|---|
| 6041 | 7/1879 | Sweden | 229/82 |
| 9868 | 4/1912 | United Kingdom | 229/82 |

*Primary Examiner*—Bryon P. Gehman
*Attorney, Agent, or Firm*—Hayes, Soloway, Hennessey & Hage

[57] ABSTRACT

A shielded disk mailing envelope comprising a protective envelope made of thin material such as paper, cardboard, or plastic that is adapted to receive a floppy disk cartridge assembly. The protective envelope has substantially square rear and front walls. The front and rear walls are joined at a common bottom edge which allows the front wall to pivot about this edge. Side edge flaps are pivotally joined along the side edges of the rear wall, such that these side edge flaps can be folded inwardly toward the inner surface of the rear wall. The front wall is likewise folded inwardly toward the inner surface of the rear wall. The front wall inner surface is adhered to the outer surface of the previously folded side edge flaps, thus forming an envelope. At the top edge of the rear wall a cover flap is pivotally joined. This cover flap is folded over the opening created at the top of the envelope and acts to close the envelope creating a protective container. An electrically conductive continuous film is adhered to all inner surfaces of the protective envelope. This electrically conductive continuous film is typically applied to the paper or cardboard material, that forms the body of the protective envelope, prior to processing by die cutting it into a blank. The electrically conductive continuous film creates a Gaussian Surface that is impenetrable to electromagnetic energy.

3 Claims, 3 Drawing Sheets

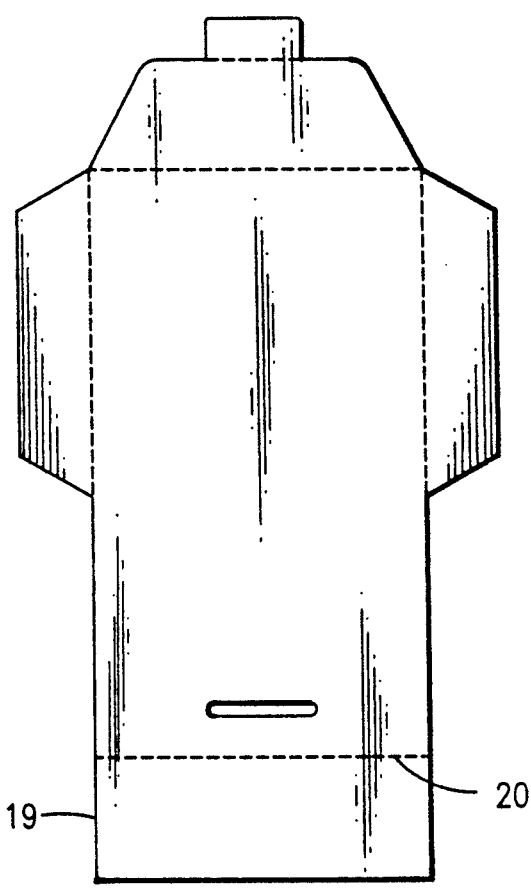
FIG.6
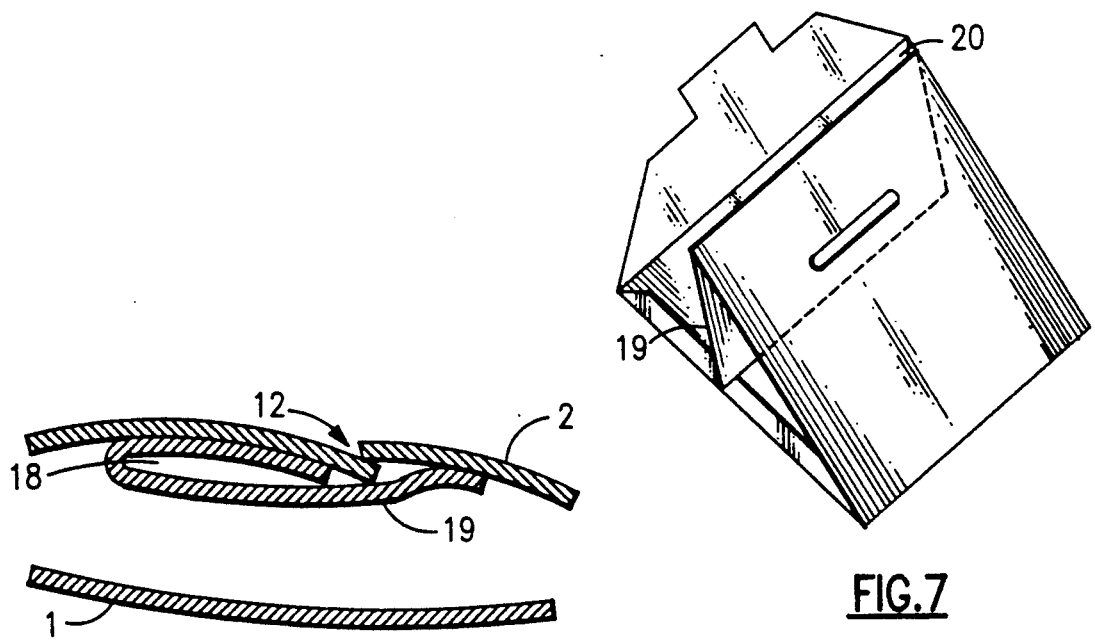
FIG.7
FIG.8

SHIELDED FLOPPY DISK CARTRIDGE MAILING ENVELOPE

BACKGROUND OF THE INVENTION

1. Field of the Invention

The present invention relates to a new and useful shielded envelope for mailing floppy disk cartridges, used in information processing systems.

2. Description of the Prior Art

Floppy disk cartridges are well known in the art and used extensively in computers and other information processing systems for storage of information signals. The disk itself on which information signals are stored is a circular device which has a magnetic coating on at least one side thereof. The disk is enclosed in an essentially rectangular plastic jacket which includes an outer cover and a non-abrasive liner. Accordingly, a floppy disk cartridge is an assembly of the jacket and the disk.

It is very important that the floppy disk cartridge be treated with care to prevent inadvertent damage to the disk or non-reproducibility of the information stored thereon. Floppy disks are susceptible to extreme temperature conditions, exposure to electric and magnetic fields, static electric discharge, as well as dust and dirt. Exposure to such conditions may adversely affect the operation of the floppy disk cartridge and the reproducibility of the stored information. For these reasons, the industry has found it advantageous to store floppy disk cartridges in protective envelopes, during transportation or mailing.

The protective envelopes currently on the market comprise basically a rear wall and a front wall joined together at the bottom and two opposite sides to form an open pocket, which is dimensioned to receive the floppy disk cartridge. The height of the rear wall may be greater than that of the front wall so that it extends beyond the opening of the pocket. Such a design allows the cartridge to be easily inserted into and removed from the protective envelope. The depth of the pocket formed by joining the rear and front wall of the protective envelope is usually about two-thirds to three-fourths greater than the diameter of the floppy disk. Prior art examples of structurally protective envelopes include U.S. Pat. No. 4,473,153 granted to Colangelo on Sep. 25, 1984, U.S. Pat. No. 4,623,325 granted to Mori et al on Nov. 18, 1986, and U.S. Pat. No. 4,852,740 granted to Sellar et al on Mar. 11, 1988.

U.S. Pat. No. 4,473,153, is a representative example of prior art floppy disk cartridge protective envelopes. The flexible disk cartridge envelope of U.S. Pat. No. 4,473,153 basically comprises a single sheet of paper material or the like which is shaped or folded to form a front wall, a rear wall, and a protective cover or flap. The front and rear walls are joined on three sides at corresponding peripheral edges by either side flaps or folds to form an open pocket dimensioned to receive at least a portion of the disk cartridge. The height of the rear wall may be greater than that of the front wall so that a portion of the rear wall extends above the opening of the pocket. The protective cover is pivotally joined to the outermost edge of the rear wall extension and should have a length at least equal to the distance the rear wall projects above the pocket opening. In this manner, the cover can be pivoted away from the pocket opening so that a disk cartridge contained in the pocket can be removed, or pivoted downward to meet the front wall so that the disk cartridge is entirely enclosed within the protective envelope.

The envelope may further include a locking device to insure that the envelope remains closed. This locking device may comprise recontact adhesive applied to the covers so that the cover adheres to the front wall of the envelope when in the closed position.

Furthermore, the paperlike material used to construct the paper envelope in accordance with the prior art patents should be of a thickness to provide the protective envelope with sufficient rigidity The material may be uncoated, coated, or coated one sided paper, or a spun bonded olefin commonly referred to by the trade name Tyvek. Alternatively, the envelope may be entirely or partially formed of a vinyl material. A portion of the surfaces of the envelope which are exposed when the cover is in the closed position may be covered with a protective coating. Actual choice of construction material may be based on strength, rigidity, smoothness, anti-static, anti-lint, or any other desired properties.

Due to their size, closing features, and weight the protective envelopes taught by the aforementioned prior art patents are not suitable for mailing. While U.S. Pat. No. 4,653,639 granted to Traynor on Mar. 31, 1987 does describe a protective envelope reportedly suitable for mailing, Traynor does not teach or suggest any protection of the floppy disks from ambient electromagnetic energy. Likewise, none of the other prior art protective envelopes cited above teach or suggest the electromagnetic shielding of the floppy disk.

The coating or covering of material used to construct protective envelopes is also known in the prior art as, for example, in U.S. Pat. No. 4,355,718 granted to Hagelberg on Oct. 26, 1982. Hagelberg teaches a grammaphone record jacket having an electrically conducting material applied to the inner side (broad) surfaces of the jacket for the purpose of discharging electrostatic charge that may build up on the grammaphone record surfaces. However, there is no disclosure or suggestion in Hagelberg of covering all the inner edge surfaces, or the desirability of doing so.

There are many inherent problems associated with the application of electrically conductive coatings to the prior art protective envelopes. In particular, such coatings lack resiliency in flexure and, therefore, have a tendency to crack causing electrical discontinuities within the surfaces of the protective envelopes. This cracking may manifest itself during the opening and closing of aforementioned protective covers or during its manufacture. Similarly, said coatings, when applied, tend to be discontinuous or inconsistent in thickness and electrical continuity. These inherent features in the prior art result in inefficient shielding protection from electromagnetic impulses or static electric discharge.

As floppy disks have become more prominent as a means for storing information, integrity of data, especially during mailing, has become of increasing concern to the user. Ambient electromagnetic energy can easily erase or alter magnetically stored data. Floppy disks can come into contact with electromagnetic energy at any time during their trip through the postal system. Post Office sorting equipment, power cables, power equipment, and the like are just a few examples of electromagnetic energy sources.

OBJECTS AND SUMMARY OF THE INVENTION

An object of the present invention is to provide a new and useful shielded protective envelope for a floppy disk cartridge which provides the floppy disk cartridge with maximum protection against damage due to ambient electromagnetic energy.

A further object of the present invention is to provide a shielded floppy disk mailing envelope which is structurally supportive of the floppy disk and provides a continuous electromagnetic shield, leaving no portion of the disk or jacket exposed to harmful electromagnetic energy.

The shielded disk mailing envelope of the present invention basically comprises a protective envelope made of thin material such as paper, cardboard, or plastic that is adapted to receive a floppy disk cartridge assembly. The protective envelope has substantially square rear and front walls. The front and rear walls are joined at a common bottom edge which allows the front wall to pivot about this edge. Side edge flaps are pivotally joined along the side edges of the rear wall, such that these side edge flaps can be folded inwardly toward the inner surface of the rear wall. The front wall is likewise folded inwardly toward the inner surface of the rear wall. The front wall inner surface is adhered to the outer surface of the previously folded side edge flaps, thus forming an envelope. At the top edge of the rear wall a cover flap is pivotally joined. This cover flap is folded over the opening created at the top of the envelope and acts to close the envelope creating a protective container.

Electrically conductive continuous film is adhered to all inner surfaces of the protective envelope. This electrically conductive continuous film is typically applied to the paper or cardboard material, that forms the body of the protective envelope, prior to processing by die cutting it into a blank. The electrically conductive continuous film creates a Gaussian Surface that is impenetrable to electromagnetic energy. A floppy disk cartridge placed in the envelope is thus shielded from the deleterious effects of electromagnetic impulses and electrostatic discharges. In this way, data stored on the magnetic medium of the floppy disk is secure.

The envelope may further include a slot formed through the front wall that is capable of receiving a tab flap formed on the cover flap such that the cover can be temporarily locked in place. This slot and tab flap feature allow for reuse of the shielded floppy disk mailing envelope.

The electrically conductive continuous film may be coated with various conductive metals. The conductive metals must be resilient in flexure, to withstand the aforementioned folding process They must also be suitable for application to thin, flexible films. While the cost of said metals is a major consideration, in some cases where high reliability is called for, precious metals may be specified.

Interior features such as slot shielding tabs located on the side edge flaps may be incorporated and positioned such that any possible leakage of electromagnetic energy through the slot-tab interface is prevented.

In another embodiment of the present invention a slot shielding pocket is formed between the front wall and the interior of the protective envelope. The front wall slot opens into this pocket. The slot shielding pocket is created by inwardly folding a shielding pocket flap, pivotally joined at the top edge of the front wall, and fixing it, at its marginal edges to the front wall inner surface. The slot shielding pocket receives the tab flap when the cover flap is folded and locked in place. Any possible leakage of electromagnetic energy through the slot-tab interface is thus prevented.

In a further embodiment of the present invention the electrically conductive continuous film may be positioned between the surfaces of, for example, cardboard material, such that the film is not visible on interior or exterior surfaces of the shielded protective envelope.

For the further understanding of the present invention, reference should be had to the following detailed description taken in connection with accompanying drawings wherein:

BRIEF DESCRIPTION OF THE DRAWINGS

FIG. 6 is a two-dimensional view of a third embodiment of the shielded floppy disk mailing envelope illustrating the slot shielding flap, prior to folding;

FIG. 7 is a perspective view of the shielded floppy disk mailing envelope incorporating the slot shielding flap shown just prior to final assembly;

FIG. 8 is a two-dimensional non-scaled view of a slot shielding pocket with a slot shielding flap fully folded and adhered to the front wall inner surface and a tab flap fully inserted in the slot.

DESCRIPTION OF THE PREFERRED EMBODIMENT

Figure 1:
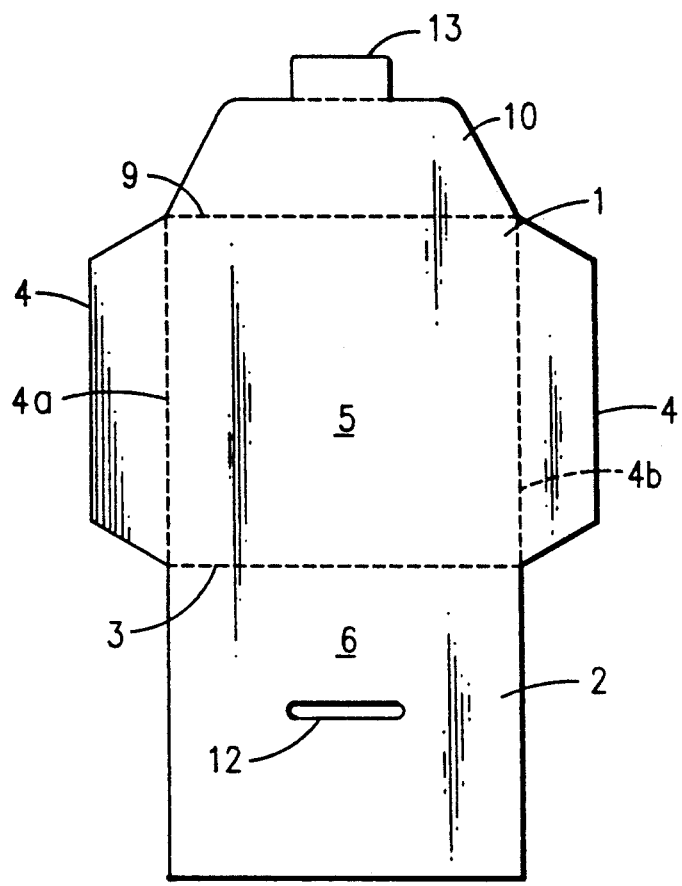
FIG. 1 is a two-dimensional view of a first embodiment of the shielded floppy disk mailing envelope before assembly.
Figure 2:
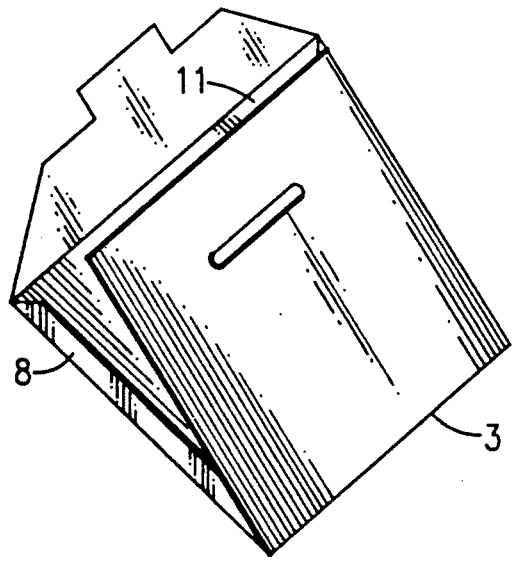
FIG. 2 is a perspective view of the embodiment shown in FIG. 1 just prior to final assembly.

Referring now to the drawings in detail and to FIGS. 1-8 thereof, it will be seen that a shielded floppy disk mailing envelope constructed in accordance with the present invention has a substantially square rear wall 1 and front wall 2, as shown in FIG. 1. The front and rear walls being joined at a common bottom edge 3 which allows the front wall to pivot about this edge, as best illustrated in FIG. 2. Side edge flaps 4 are pivotally joined along the side edges 4a and 4b of rear wall 1. The side edge flaps 4 are pivotally folded inwardly toward the inner surface 5 of the rear wall 1. The front wall 2 is likewise folded inwardly toward the inner surface 5 of the rear wall 1. Once the front wall 2 is fully pivotally folded about common bottom edge 3, the front wall inner surface 6 is adhered to the outer surface 8 of the previously pivotally folded side edge flaps 4, thus forming an envelope. FIG. 2 illustrates the shielded floppy disk mailing envelope, immediately prior to final assembly. Adherence of the front wall inner surface 6 to the pivotally folded side edge flap outer surface 8 may be accomplished by application of adhesives well known to one skilled in the art.

The top edge 9 of the rear wall 1 is pivotally joined to a cover flap 10. When the shielded floppy disk mailing envelope is fully assembled, the cover flap 10 may be pivotally folded about said top edge 9 toward the opening 11 created at the top of the envelope. The cover flap 10 acts to close the envelope creating a protective pocket into which a floppy disk can be placed.

The shielded floppy disk mailing envelope may further include a slot 12 formed through the front wall 2. Slot 12 is positioned in front wall 2 to receive tab flap 13 pivotally joined to the cover flap 10. When the cover flap 10 is pivotally folded about said top edge 9 toward the opening 11 created at the top of the envelope, the tab flap 13 is received into said slot 12, thus effecting a temporary locking of the cover flap in a closed position. The slot 12 and tab flap 13 interface allow for reuse of the shielded floppy disk mailing envelope.

Figure 3:
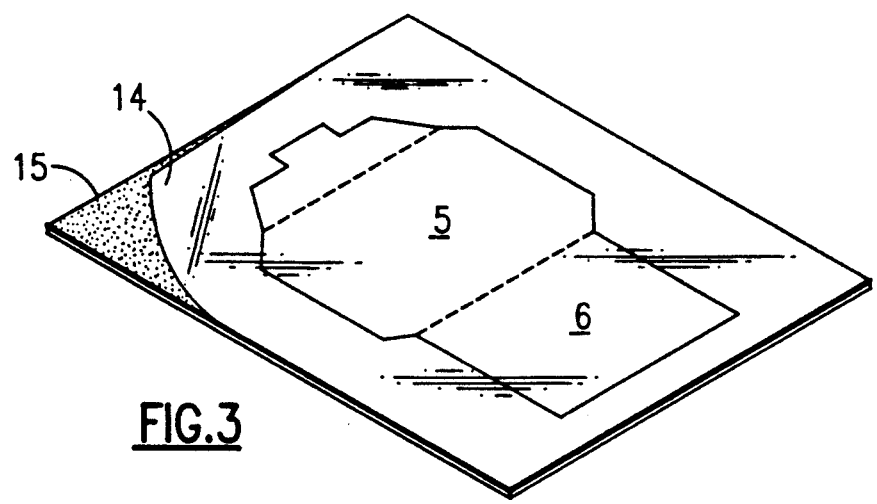
FIG. 3 is a perspective view of a first embodiment of the shielded floppy disk mailing envelope prior to die cutting from a continuous paper or card board backing, showing the electrically conductive continuous film partially peeled away from said paper or cardboard backing.

Referring now to FIG. 3, electrically conductive continuous film 14 is adhered to at least one surface of any suitable envelope material 15, for forming the body of the protective envelope including paper, cardboard, and plastic. The electrically conductive continuous film 14, is applied to the protective envelope material 15 prior to die cutting. FIG. 3 is an illustration of the electrically conductive continuous film partially peeled away from said backing material 15 prior to cutting into blank form.

The electrically conductive continuous film 14 creates a barrier to ambient electromagnetic energy such that a floppy disk cartridge placed in the mailing envelope is shielded from the deleterious effects of ambient electromagnetic energy. The electrically conductive continuous film 14 may be coated with various conductive metals including aluminum, copper, silver, and gold.

Figure 4:
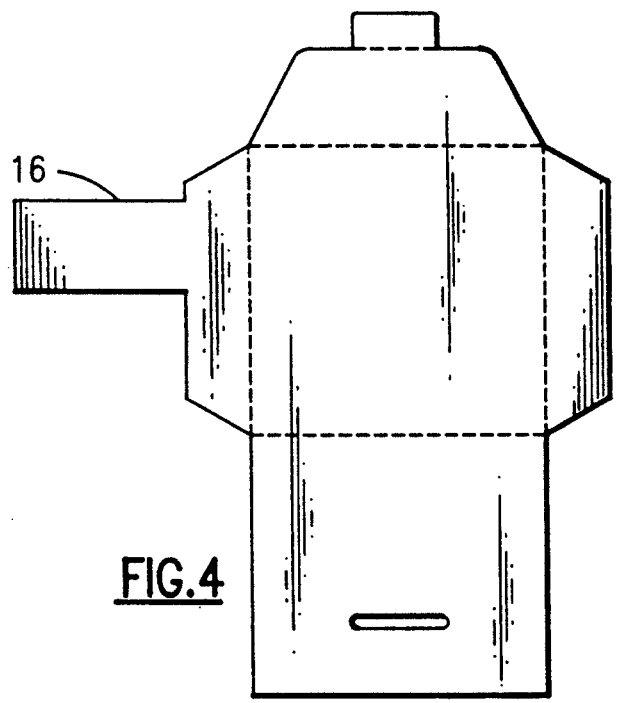
FIG. 4 is a two-dimensional view of a second embodiment of the shielded floppy disk mailing envelope with an example of a slot shielding tab located on one of the side edge flaps.

Referring now to FIG. 4, slot shielding tab 16 may be located on said side edge flaps 4, in a second embodiment. The slot shielding tab is positioned as a result of the side edge flaps 4 being pivotally folded inwardly toward the inner surface 5 of the rear wall 1, to prevent any possible leakage at the slot-locking tab interface.

Figure 5:
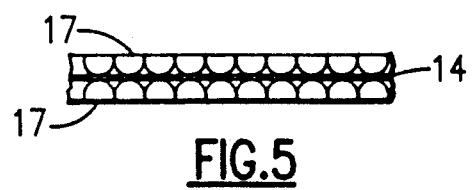
FIG. 5 is a crossectional view of cardboard backing, showing the electrically conductive continuous film positioned near its center.

Referring now to FIG. 5, electrically conductive continuous film 14 may be positioned between the surfaces of, for example, cardboard material 17. The electrically conductive continuous film 14 is not visible on interior or exterior surfaces of the shielded protective envelope. This arrangement provides added protection to the electrically conductive continuous film 14 by reducing the possibility of puncture.

Referring now to FIGS. 6, 7, and 8, a slot shielding pocket 18 is formed between the front wall 2 and the front wall inner surface 6 of the protective envelope. The front wall slot 12 opens into the slot shielding pocket 18. The slot shielding pocket is created by inwardly folding the shielding pocket flap 19, pivotally joined at the top edge 20 of the front wall 2, and fixing it, at its marginal edges to the front wall inner surface. The slot shielding pocket 18 receives the tab flap 13 when the cover flap 10 is folded and locked in place, as illustrated in FIG. 8.

Although the invention has been described in terms of preferred structures, it will be obvious to those skilled in the art that many alterations and variations may be made without departing from the invention. Accordingly, it is intended that all such alterations and variations be considered as within the spirit and scope of the invention as defined by the appended claims.

What is claimed is:

1. A protective envelope made of thin material and adapted to receive and contain a floppy disk cartridge assembly, said envelope comprising a rear wall and a front wall, each said wall having an inner and outer surface and a top edge, respectively, said walls being joined by a pivotal common bottom edge, said envelope also having side edge flaps pivotally joined along side edges of said rear wall such that said side edge flaps can be folded inwardly toward the inner surface of said rear wall, said front wall being likewise foldable inwardly toward the inner surface of said rear wall, the inner surface of said front wall being adherable to an outer surface of said side edge flaps when said side edge flaps are folded inwardly toward the inner surface of said rear wall to form a pocket having an opening, said top edge of said rear wall having a pivotally joined cover flap including a pivotally joined tab flap which extends outwardly from a top edge of said cover flap, an electrically conductive continuous film sandwiched between the inner and outer surfaces of said front and rear walls of said envelope to form a continuous and puncture resistant barrier against ambient electromagnetic energy such that a floppy disk cartridge placed in said envelope is shielded from deleterious effects of said electromagnetic energy, slot means in said front wall providing a second opening such that said tab flap may be inserted therein to maintain said cover in closed position when said tab flap is inserted into said slot means to form a substantially electromagnetically secure shielded pocket, and an inwardly folding shielding pocket flap pivotally joined at said top edge of said front wall, said shielding pocket flap adhered at its marginal edges to said inner surface of said front wall to form a slot-shielding pocket such that said slot means opens into said slot-shielding pocket capable of preventing leakage of electromagnetic energy to said floppy disk cartridge when said tab flap is inserted in said slot means.

2. A shielded protective envelope according to claim 1 wherein said electrically conductive continuous film is coated with a conductive metal selected from the group consisting of aluminum, copper, silver, and gold.

3. A shielded protective envelope according to claim 1 wherein said envelope is made of cardboard material.

* * * * *